(12) United States Patent
Timonen et al.

(10) Patent No.: US 10,939,034 B2
(45) Date of Patent: Mar. 2, 2021

(54) IMAGING SYSTEM AND METHOD FOR PRODUCING IMAGES VIA GAZE-BASED CONTROL

(71) Applicant: Varjo Technologies Oy, Helsinki (FI)

(72) Inventors: Ville Timonen, Espoo (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/505,640

(22) Filed: Jul. 8, 2019

(65) Prior Publication Data

US 2021/0014408 A1 Jan. 14, 2021

(51) Int. Cl.
*H04N 5/232* (2006.01)
*G06K 9/00* (2006.01)
*G06T 7/62* (2017.01)

(52) U.S. Cl.
CPC ..... *H04N 5/23219* (2013.01); *G06K 9/00664* (2013.01); *G06T 7/62* (2017.01); *H04N 5/23216* (2013.01)

(58) Field of Classification Search
CPC .. H04N 5/23219; H04N 5/23216; G06T 7/62; G06K 9/00664
See application file for complete search history.

(56) References Cited

U.S. PATENT DOCUMENTS

| | | | | |
|---|---|---|---|---|
| 10,382,699 | B2* | 8/2019 | Rainisto | G02B 27/0093 |
| 2015/0199559 | A1* | 7/2015 | Sztuk | G06F 3/013 |
| | | | | 348/78 |
| 2015/0229838 | A1* | 8/2015 | Hakim | H04N 5/23222 |
| | | | | 348/333.02 |
| 2017/0061693 | A1* | 3/2017 | Kohler | G06T 19/00 |
| 2017/0343809 | A1* | 11/2017 | Benesh | G09G 5/00 |

* cited by examiner

*Primary Examiner* — Luong T Nguyen
(74) *Attorney, Agent, or Firm* — Ziegler IP Law Group, LLC

(57) ABSTRACT

An imaging system for producing images for a display apparatus. The imaging system includes at least one camera, and processor communicably coupled to the at least one camera. The processor is configured to: obtain, from display apparatus, information indicative of current gaze direction of a user; determine, based on current gaze direction of the user, an object of interest within at least one display image, wherein the at least one display image is representative of a current view presented to user via display apparatus; adjust, based on a plurality of object attributes of the object of interest, a plurality of camera attributes of the at least one camera for capturing a given image of a given real-world scene; and generate from the given image a view to be presented to user via display apparatus.

18 Claims, 2 Drawing Sheets

IMAGING SYSTEM AND METHOD FOR PRODUCING IMAGES VIA GAZE-BASED CONTROL

TECHNICAL FIELD

The present disclosure relates generally to imaging systems; and more specifically, to imaging systems for producing images for display apparatuses. Moreover, the present disclosure also relates to methods of producing images for display apparatuses.

BACKGROUND

Presently, several technologies (for example, such as virtual reality (VR), augmented reality (AR), mixed reality (MR) and extended reality (XR)) are being used to present interactive simulated environments to users. The users utilize specialized Head-Mounted Devices (HMDs) for experiencing and interacting with such simulated environments. Conventional HMDs display images that collectively constitute such simulated environments, to the user. When such images are captured according to a gaze direction of the user, the simulated environments would appear realistic to the user.

In order to capture gaze-contingent images, various types of imaging equipment and techniques are currently being employed. As an example, in filmography, camera operators manually adjust cameras for imaging a real-world environment. By way of such manual adjustment, the camera operators have full control over image content of the real-world environment to direct the user's gaze as required. As another example, in a handheld consumer camera, the user's gaze is often automatically programmed to lie at a centre of the real-world environment. Otherwise, there also exist provisions for the user to manually set (for example, by touching a screen of the handheld consumer camera) a region at which his/her gaze is focused.

However, such imaging equipment and techniques are unsuitable for use with HMDs. Using conventional imaging equipment and techniques with HMDs is associated with several problems. Firstly, the HMDs generally employ video see-through camera arrangements for imaging the real-world environment. Due to limitations of existing hardware, said video see-through camera arrangements are unable to utilize tracked data of the user's gaze whilst capturing images. As a result, the images captured by such video see-through camera arrangements are not truly gaze-contingent. Secondly, properly displaying images generated via the video see-through camera arrangements requires extremely high framerates and resolution. This puts pressure on technical capabilities of the video see-through camera arrangements. In instances where imaging in High-Dynamic-Range (HDR) is required, the video see-through camera arrangements are unable to cope with such specialized complex imaging requirements. Thirdly, even when using advanced video see-through camera arrangements that have high framerates and resolution, depth of field and exposure requirements for providing realism within the simulated environments are too stringent for said video see-through camera arrangements to cope with. As a result, the captured images are full of noise, and are often either over-exposed or under-exposed. Moreover, in such captured images, moving objects within the real-world environment are often motion blurred beyond recognition. Computing optical flows for these moving objects is computationally expensive, and prohibitive for real time imaging requirements of the video see-through camera arrangements.

Therefore, in light of the foregoing discussion, there exists a need to overcome the aforementioned drawbacks associated with generating images for display apparatuses.

SUMMARY

The present disclosure seeks to provide an imaging system for producing images for a display apparatus. The present disclosure also seeks to provide a method of producing images for a display apparatus. The present disclosure seeks to provide a solution to the existing problem of unsuitability of suboptimal conventional imaging equipment and techniques for use with Head-Mounted Devices. An aim of the present disclosure is to provide a solution that overcomes at least partially the problems encountered in prior art, and provides an efficient imaging system that produces realistic gaze-contingent images for the Head-Mounted Devices.

In one aspect, an embodiment of the present disclosure provides an imaging system for producing images for a display apparatus, the imaging system comprising:

at least one camera; and
a processor communicably coupled to the at least one camera, wherein the processor is configured to:
  obtain, from the display apparatus, information indicative of a current gaze direction of a user;
  determine, based on the current gaze direction of the user, an object of interest within at least one display image, wherein the at least one display image is representative of a current view presented to the user via the display apparatus;
  adjust, based on a plurality of object attributes of the object of interest, a plurality of camera attributes of the at least one camera for capturing a given image of a given real-world scene; and
  generate from the given image a view to be presented to the user via the display apparatus.

In another aspect, an embodiment of the present disclosure provides a method of producing images for a display apparatus, the method comprising:

obtaining, from the display apparatus, information indicative of a current gaze direction of a user;
determining, based on the current gaze direction of the user, an object of interest within at least one display image, wherein the at least one display image is representative of a current view presented to the user via the display apparatus;
adjusting, based on a plurality of object attributes of the object of interest, a plurality of camera attributes of at least one camera for capturing a given image of a given real-world scene; and
generating from the given image a view to be presented to the user via the display apparatus.

Embodiments of the present disclosure substantially eliminate or at least partially address the aforementioned problems in the prior art, and enable production of realistic, gaze-contingent images in real time or near-real time for Head-Mounted Devices.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
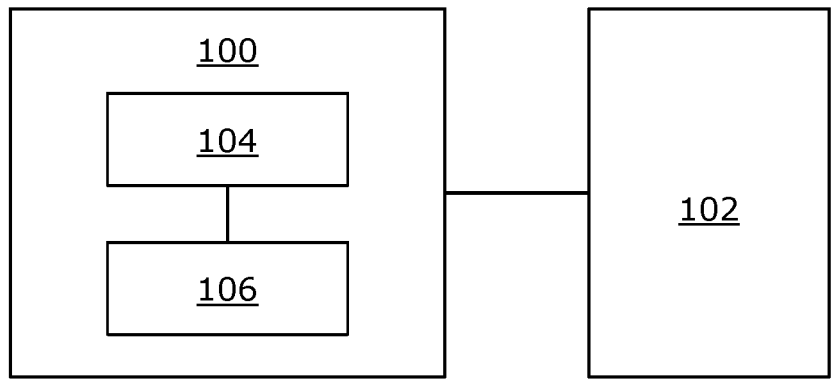
FIGS. 1 and 2 illustrate block diagrams of architectures of an imaging system for producing images for a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system for producing images for a display apparatus, the imaging system comprising:
at least one camera; and
a processor communicably coupled to the at least one camera, wherein the processor is configured to:
  obtain, from the display apparatus, information indicative of a current gaze direction of a user;
  determine, based on the current gaze direction of the user, an object of interest within at least one display image, wherein the at least one display image is representative of a current view presented to the user via the display apparatus;
  adjust, based on a plurality of object attributes of the object of interest, a plurality of camera attributes of the at least one camera for capturing a given image of a given real-world scene; and
  generate from the given image a view to be presented to the user via the display apparatus.

In another aspect, an embodiment of the present disclosure provides a method of producing images for a display apparatus, the method comprising:
  obtaining, from the display apparatus, information indicative of a current gaze direction of a user;
  determining, based on the current gaze direction of the user, an object of interest within at least one display image, wherein the at least one display image is representative of a current view presented to the user via the display apparatus;
  adjusting, based on a plurality of object attributes of the object of interest, a plurality of camera attributes of at least one camera for capturing a given image of a given real-world scene; and
  generating from the given image a view to be presented to the user via the display apparatus.

The present disclosure provides the aforementioned imaging system and the aforementioned method. The images produced by the imaging system are gaze-contingent and realistic since the imaging system efficiently utilizes the information indicative of the current gaze direction of the user. When the user is presented the view generated by the processor, the user experiences considerable realism and immersion within said view. The imaging system implements both physical adjustments and processing-based adjustments to provide the user with such an experience. Beneficially said adjustments are made in real time or near-real time, and therefore imperceptible to the user. Moreover, the method described herein is computationally efficient.

Throughout the present disclosure, the term "imaging system" refers to an equipment configured to produce the images for the display apparatus. It will be appreciated that the imaging system produces said images in real time or near real time.

Throughout the present disclosure, the term "display apparatus" refers to a specialized equipment that is configured to present a simulated environment to the user when the display apparatus in operation is worn by the user on his/her head. In such an instance, the display apparatus acts as a device (for example, such as a mixed reality headset, a pair of mixed reality glasses, and the like) that is operable to present a visual scene of the simulated environment to the user. The display apparatus may also commonly be referred to as "head-mounted display apparatus".

It will be appreciated that a plurality of views to be presented to the user would be generated by the imaging system. Said plurality of views to be presented to the user collectively constitute the visual scene of the simulated environment.

Optionally, the display apparatus comprises a Fovea Contingent Display (FCD) that, in operation, renders the visual scene of the simulated environment. Optionally, in this regard, the FCD is implemented as a first display having a first display resolution and a second display having a second display resolution, the second display resolution being higher than the first display resolution. It will be appreciated that the FCD is designed to imitate a physiology of human vision. The FCD allows for increasing immersion and realism within the simulated environment.

The imaging system is at least communicably coupled to the display apparatus. By way of such communicable coupling, the imaging system transmits the produced images to the display apparatus. In some implementations, the imaging system is integrated with the display apparatus. In such implementations, the imaging system is physically coupled to the display apparatus (for example, attached via mechanical and electrical connections to components of the display apparatus). In other implementations, the imaging system is implemented on a remote device that is separate from the display apparatus. In such implementations, the imaging system and the display apparatus are communicably coupled via a wired communication interface or a wireless communication interface. Optionally, the imaging system is mounted on the remote device. Examples of the remote device include, but are not limited to, a drone, a vehicle, and a robot. In such an instance, the remote device is physically positioned at a given real-world environment, whereas the user of the display apparatus is positioned away from (for example, at a distance from) the remote device.

Throughout the present disclosure, the term "camera" refers to equipment that is operable to detect and process light from the given real-world scene, so as to capture the given image of the given real-world scene. Optionally, the at least one camera comprises a camera chip, wherein the light from the given real-world scene is directed by at least one optical element onto a photosensitive surface of the camera chip, thereby enabling the at least one camera to capture the given image of the given real-world scene.

It will be appreciated that the term "at least one camera" refers to "one camera" in some implementations, and "a plurality of cameras" in other implementations.

Optionally, the at least one camera is implemented as at least one of: a Red-Green-Blue (RGB) camera, a RGB-Depth (RGB-D) camera, a stereo camera, a plenoptic camera.

Throughout the present disclosure, the term "processor" refers to hardware, software, firmware or a combination of these. The processor controls operation of the imaging system. The processor is communicably coupled to the at least one camera wirelessly and/or in a wired manner. By way of such coupling, the processor obtains the given image from the at least one camera. As an example, the imaging system may be mounted on a robot in a manner that the at least one camera is mounted on an outer surface of the robot, whereas the processor is mounted inside a body of the robot. In such an example, the processor may be wirelessly coupled to the at least one camera.

The processor is configured to obtain, from the display apparatus, information indicative of the current gaze direction of a user. Notably, the processor is at least coupled in communication with the display apparatus.

Optionally, the display apparatus comprises means for detecting a gaze direction of the user, said means being configured to produce the information indicative of the gaze direction of the user. Optionally, in this regard, the processor obtains, from the means for detecting a gaze direction, the information indicative of the gaze direction of the user.

Throughout the present disclosure, the term "means for detecting the gaze direction" refers to specialized equipment for detecting and/or following a direction of gaze of the user of the display apparatus, when said user views the at least one display image via the display apparatus. Notably, the gaze direction of the user is detected when the display apparatus in operation is worn by the user. Optionally, the means for detecting the gaze direction is implemented by way of contact lenses with sensors, cameras monitoring the position of the pupil of the user's eye, and the like. Such means for detecting the gaze direction are well-known in the art. Beneficially, the means for detecting the gaze direction is arranged in a manner that said means does not cause any obstruction in an optical path of a projection of the at least one display image.

Throughout the present disclosure, the term "display image" refers to an image that is produced by the imaging system, and is displayed to the user via the display apparatus. The at least one display image is representative of the current view presented to the user via the display apparatus. The at least one display image is utilized for determining the object of interest within the current view, based on the current gaze direction of the user.

Optionally, the at least one display image is displayed to the user via at least one image renderer of the display apparatus. Herein, the term "image renderer" refers to equipment that, in operation, renders images that are to be displayed to the user of the display apparatus. Optionally, the at least one image renderer is implemented as at least one display. Optionally, the at least one image renderer is implemented as at least one projector. In this regard, the images are projected onto a projection screen or directly onto a retina of the user's eyes.

The processor is configured to determine, based on the current gaze direction of the user, the object of interest within at least one display image. Throughout the present disclosure, the term "object of interest" refers to a given object represented in the at least one display image, towards which the gaze direction of the user is directed (namely, focused) when the user is presented the current view via the display apparatus. In other words, the object of interest is a fixation object within the at least one display image. When the gaze direction of the user is directed towards the object of interest, the object of interest is focused onto the fovea of the user's eyes, and is resolved to a much greater detail as compared to the remaining object(s) of the at least one display image.

Optionally, the current view comprises a mixed reality view, wherein the object of interest is a virtual object.

Alternatively, optionally, the current view comprises a mixed reality view, wherein the object of interest is a real object.

Throughout the present disclosure, the term "mixed reality view" refers to a view that is formed upon a combination of a real-world view of the given real-world scene and a virtual view (namely, a computer-generated view). Optionally, the virtual view is superposed on the real-world view. In particular, the mixed reality view represents a plurality of objects, wherein the plurality of objects comprise at least one virtual object and at least one real object. The at least one display image that is representative of the mixed reality view would depict said plurality of objects. Moreover, the virtual view represents the at least one virtual object, whereas the real-world view represents the at least one real object.

Optionally, the real-world view of the given real-world scene is captured via the at least one camera, whereas the virtual view is generated by the processor. Optionally, when the current view comprises the mixed reality view, the processor is configured to digitally add the virtual view to the real-world view for generating the at least one display image. Notably, the at least one camera provides a video see-through arrangement for the display apparatus, thereby enabling the user to view the given real-world scene whilst wearing the display apparatus.

It will be appreciated that optionally, in the current view, the plurality of objects are arranged at a plurality of optical depths. Optionally, an optical depth of a first object in the current view is different from an optical depth of a second object in the current view. Moreover, optionally, at least two objects among the plurality of objects in the current view are arranged at a same optical depth. Furthermore, optionally, different portions of a given object lie at different optical depths.

It will be appreciated that the "optical depth" of a real object refers to an optical distance between said real object and the at least one camera, whereas the "optical depth" of a virtual object refers to an apparent optical distance between said virtual object and the user's eyes. When the real object is displayed within the at least one display image on the at least one image renderer, an apparent optical distance between the real object and the user's eyes is similar to the optical distance between the real object and the at least one camera.

As an example, the current view may be a mixed reality view wherein optical depths of two virtual objects is 2 meters and optical depths of two real objects is 3 meters. In such an example, the two virtual objects appear to be superposed on the two real objects.

Throughout the present disclosure, the term "virtual object" refers to a computer-generated object, whereas the term "real object" refers to a physical object that is present in the given real-world scene. Examples of the virtual object include, but are not limited to, a virtual navigation tool (for example, such as a virtual map, a virtual direction signage, and so forth), a virtual gadget (for example, such as a virtual calculator, a virtual computer, and so forth), a virtual message (for example, such as a virtual instant message, a virtual chat conversation, a virtual to-do note, and so forth), a virtual entity (for example, such as a virtual person, a virtual animal, a virtual ghost, and so forth), a virtual entertainment media (for example, such as a virtual painting, a virtual video, a virtual interactive advertisement, and so forth), and a virtual information (for example, such as a virtual news description, a virtual announcement, virtual data, and so forth). Similarly, examples of the real object include, but are not limited to, a real navigation tool, a real gadget, a real message, a real entity, a real entertainment media, and a real information.

As an example, when the current view comprises a mixed reality view of a garden environment, said current view may represent three real objects (for example, such as a lawn, a swing set, and a pond) and two virtual objects (for example, such as a virtual ball, a virtual bench). In one case, the object of interest may be a real object (for example, the swing set). In an alternative case, the object of interest may be a virtual object (for example, the virtual ball).

Optionally, in the mixed reality view, a given virtual object is superposed at least partially on a given real object. Optionally, the given virtual object is superposed on a plurality of real objects. It will be appreciated that when the given virtual object is superposed upon any real object(s), the real object(s) may or may not be visible to the user, depending on a nature of such superposition and/or a transparency of the given virtual object.

As an example, a given mixed reality view may be formed upon superposition of a given virtual view on a given real-world view, wherein the given real-world view represents two real objects R1 and R2, and the given virtual view represents two virtual objects V1 and V2. The virtual object V1 may be opaque, whereas the virtual object V2 may be substantially transparent. In the given mixed reality view, (i) the virtual object V1 may be superposed onto the real object R1 in a manner that the real object R1 is not visible to the user, and (ii) the virtual object V2 may be superposed onto the real object R2 in a manner that both the virtual object V2 and the real object R2 are visible to the user. Such an example has been illustrated in conjunction with FIG. 3, for the sake of clarity.

Optionally, when determining the object of interest, the processor is configured to:
  analyze the at least one display image to identify a plurality of pixel segments representative of a plurality of objects present within the at least one display image;
  identify, based on the current gaze direction of the user, at least one of the plurality of pixel segments at which the user is gazing; and
  determine from the at least one of the plurality of pixel segments a size and/or shape of the object of interest.

Throughout the present disclosure, the term "pixel segment" refers to a given group of pixels within a given display image, the given group of pixels having at least one visual attribute in common with each other. Notably, different pixel segments are different from each other in respect of their visual attributes. Examples of the at least visual attribute include, but are not limited to, a color, an intensity, a hue, a texture, a geometry, and a sharpness.

It will be appreciated that the at least one display image comprises the plurality of pixel segments, wherein at least one pixel segment is representative of a given object present within the at least one display image.

Optionally, the processor employs at least one image segmentation algorithm to identify the plurality of pixel segments. Examples of the at least one image segmentation algorithm include, but are not limited to, a K-means clustering algorithm, an edge detection algorithm, a graph partitioning algorithm, a thresholding algorithm, and a supervised leaning neural network-based algorithm. These image segmentation algorithms are well known in the art. Herein, the term "image segmentation" refers to a technique of partitioning the at least one display image into the plurality of pixel segments based upon visual attributes of pixels within the at least one display image. Notably, a set of pixels having one or more visual attributes in common is grouped into a single pixel segment.

As an example, given a display image representative of a meadow environment, the processor may analyze said display image to identify four pixel segments representative of three objects present within said display image. The four pixel segments may be different from each other in respect of a color of their constituent pixels and an overall geometry of their constituent pixels. A first pixel segment may comprise pixels having a blue color, a second pixel segment may comprise pixels having a green color, a third pixel segment may comprise pixels having a brown color, and a fourth pixel segment may comprise pixels having a red color. In such an example, the first pixel segment may be representative of sky, the second pixel segment may be representative of grass, the third pixel segment may be representative of walls of a hut within the meadow environment, and the fourth pixel segment may be representative of a roof of the hut. Notably, the first and second pixel segments represent different objects, whereas the third and fourth pixel segments are collectively representative of a single object.

Optionally, the step of analyzing the at least one display image to identify the plurality of pixel segments is performed whilst taking into account a scene classification of the at least one display image. Herein, the term "scene classification" refers to a technique in which a given display image is classified into at least one scene category. Scene classification techniques are well known in the art. Notably, the scene classification utilizes at least a relative arrangement of the plurality of objects within the given display image and ambient contextual information of the plurality of objects to classify the given display image. A given scene category pertains to an indoor scene or an outdoor scene. Examples of the at least one scene category include, but are not limited to, a water body scene, a forest scene, a hilly scene, an aerial scene, an indoor scene, and so on.

Optionally, when identifying, based on the current gaze direction of the user, at least one of the plurality of pixel segments at which the user is gazing, the processor is configured to:

determine, based on the current gaze direction of the user, a two-dimensional region of interest in the at least one display image; and select at least one given pixel segment that overlaps with the two-dimensional region of interest in the at least one display image as the at least one of the plurality of pixel segments at which the user is gazing.

Throughout the present disclosure, the term "region of interest" refers to a region of the at least one display image whereat the gaze of the user is directed (namely, focused) when the user views the at least one display image. In other words, the region of interest is a fixation region within the at least one display image. When the gaze direction of the user is directed towards the region of interest, the region of interest is focused onto the fovea of the user's eyes, and is resolved to a much greater detail as compared to the remaining region(s) of the at least one display image.

It will be appreciated that when the at least one given pixel segment overlaps with the two-dimensional region of interest, the at least one given pixel segment corresponds to the at least one of the plurality of pixel segments at which the user is gazing. Therefore, the at least one of the plurality of pixel segments at which the user is gazing is representative of the object of interest.

Optionally, the size and/or shape of the object of interest is determined based upon a shape and/or size of the at least one of the plurality of pixel segments at which the user is gazing. Notably, the size and/or shape of said at least one of the plurality of pixel segments corresponds to the shape and/or size of the object of interest. An overall geometry of the at least one of the plurality of pixel segments at which the user is gazing defines the size and/or shape of said at least one of the plurality of pixel segments.

Optionally, a radius of the two-dimensional region of interest is determined based upon the size of the object of interest. In this regard, the two-dimensional region of interest can be understood to be substantially circular in shape, and the radius of said region of interest is selected in a manner that said region of interest entirely encompasses the object of interest.

Throughout the present disclosure, the term "object attribute" refers to a characteristic (namely, a property) of an object. Likewise, the term "camera attribute" refers to a characteristic (namely, a property) of the at least one camera. A given object attribute may be, for example, a color, a hue, a tone, a sharpness, a texture, a shape, a size, a geometry, a location, an optical depth, a velocity. A given camera attribute may be, for example, an exposure time, a sensitivity (namely, an ISO sensitivity), an aperture, a focus length, a white balance.

For capturing the given image of the given real-world scene, the processor adjusts the plurality of camera attributes of the at least one camera, said adjustment being made according to the plurality of object attributes of the object of interest. Notably, the plurality of camera attributes are adjusted entirely on the basis of a determined current gaze direction of the user, since the object of interest is determined according to said current gaze direction. Upon said adjustment, the at least one camera is configured to capture the given image according to the current gaze direction of the user in a manner that captured given image closely represents a manner in which the eyes of the user would perceive the given real-world scene. In particular, upon said adjustment, when the object of interest is a real object, the given image would realistically represent the plurality of object attributes of the object of interest. Alternatively, when the object of interest is a virtual object, the given image would realistically represent how remaining real object(s) would appear in respect of the object of interest to the user.

It will be appreciated that adjusting the plurality of camera attributes pertains to adjustment of a physical device (notably, the at least one camera) in order to present a realistic and immersive view to the user of the display apparatus. Such adjustment is automatic and is extremely accurate (since it is made according to the current gaze direction of the user).

The processor generates, from the given image, the view to be presented to the user via the display apparatus. Optionally, when the current view comprises the mixed reality view, the view to be presented to the user also comprises the mixed reality view. Optionally, in this regard, the processor is configured to add virtual content (namely, computer-generated content) to the given image for generating the view to be displayed to the user. Said virtual content corresponds to the virtual view of the mixed reality view, whilst the given image corresponds to the real-world view of the mixed reality view. The virtual content comprises the at least one virtual object. Upon addition of said virtual content to the given image, a gaze-contingent mixed reality view to be presented to the user is generated. A plurality of gaze-contingent mixed reality views collectively constitute a gaze-contingent mixed reality environment. It will be appreciated that the view to be presented to the user of the display apparatus is rendered via the at least one image renderer of the display apparatus.

Optionally, the processor is configured to adjust at least one rendering parameter whilst generating the view to be presented to the user via the display apparatus. Optionally, in this regard, the at least one rendering parameter comprises at least one of: a sharpness, a tonal reproduction, a brightness, a contrast, a color reproduction, a color gamut, a color temperature, a color saturation, a distortion correction, a vignetting effect, a chromatic aberration correction, an artifact correction, a depth of field, a blur effect. Herein, the term "rendering parameter" refers to a characteristic pertaining to how the view to be presented to the user is to be rendered.

It will be appreciated that adjustment of the plurality of camera attributes and the at least one rendering parameter allows for enhancing global image quality attributes, as well as local image quality attributes. As a result, the view that is presented to the user appears realistic and provides a sense of immersiveness to the user. Herein, the term "global image quality attributes" refers to those attributes of the given image that are independent of magnification and viewing distance, whereas the term "local image quality attributes" refers to those attributes of the given image that change with change in magnification and viewing distance. Examples of the global image quality attributes include exposure time, tonal reproduction, color reproduction, and the like. Examples of the local image quality attributes include contrast, depth of field, and the like.

It will be appreciated that the when the view to be presented to the user is generated in the aforesaid manner, an extent of realism in said view is considerably enhanced to closely emulate a manner in which the user's eye would perceive the view. Moreover, when the view to be presented comprises the mixed reality view, the object of interest being the virtual object, such a manner of generating the view to be presented allows for accurately and automatically representing a manner in which said virtual object of interest would appear to the user. Once the virtual object of interest had been added to the given image by the processor, adjusting a representation of said virtual object of interest is possible by adjusting, via processing, the at least one rendering parameter.

It will be appreciated that the steps of determining the object of interest within the at least one display image, adjusting the plurality of camera attributes of the at least one camera, and generating the view to the presented to the user are beneficially performed in real time or near-real time. This allows for generation of a gaze-contingent view to be presented to the user in an extremely short time, via physical component and processing adjustments that are imperceptible to the user.

Optionally, the processor is configured to determine the plurality of object attributes of the object of interest based on pixel values of the at least one of the plurality of pixel segments. Since the object of interest is represented by the at least one of the plurality of pixel segments, the plurality of object attributes of the object of interest correspond to the pixel values of the at least one of the plurality of pixel segments. In other words, the pixel values of the at least one of the plurality of pixel segments are indicative of a plurality of object attributes of the object of interest.

Herein, the term "pixel value" of a given pixel segment refers to a measured value of the at least one visual attribute which is common to all pixels of the given pixel segment.

As an example, for the at least one display image, ten pixel segments may be identified, said ten pixel segments being representative of four objects present within the at least one display image. Amongst these ten pixel segments, two pixel segments may be representative of an object of interest, for example, such as a tree. Notably, pixel values of a first pixel segment among said two pixel segments may indicate that pixels of the first pixel segment have a brown color, and a wooden texture. Likewise, pixel values of a second pixel segment among said two pixel segments may indicate that pixels of the second pixel segment have a green color, and a leafy texture. Therefore, in such an example, the processor may determine objects attributes of said object of interest based upon the pixel values of the first and second pixel segments. For example, a first object attribute of said object of interest may be that the object of interest has two colors: brown and green, and a second object attribute of the object of interest may be that the object of interest has two textures: wooden and leafy.

Optionally, when adjusting the plurality of camera attributes of the at least one camera, the processor is configured to adjust at least one of: a white balance, an exposure of the at least one camera according to the plurality of object attributes of the object of interest for capturing the given image of the given real-world scene. Notably, a human visual system would differently perceive a color tone of the object of interest under different lighting conditions. Therefore, adjusting at least one of: the white balance, the exposure of the at least one camera according to the plurality of object attributes of the object of interest allows the given image to emulate a manner in which the human visual system would perceive the object attributes of the object of interest.

Optionally, the processor is configured to adjust the white balance of the at least one camera by adjusting a color temperature at which the given image is to be captured. Optionally, the color temperature at which the given image is to be captured lies within a predefined range of color temperatures associated with the at least one camera, wherein the predefined range of color temperatures ranges from 1000 Kelvin to 10000 Kelvin. As an example, when the object of interest is a real object such as a beach having object attributes of white color and grainy texture, the white balance of the at least one camera may be adjusted to capture the given image at a color temperature of 5200 Kelvin.

Optionally, the processor is configured to adjust the exposure of the at least one camera by adjusting at least one of: an aperture, a shutter speed, a sensitivity with which the given image is to be captured.

Optionally, the processor is configured to adjust the aperture of the at least one camera by adjusting a f/stop value of the at least one camera. A low f/stop value (for example, such as f/1.4) corresponds to a large aperture, whereas a high f/stop value (for example, such as f/8) corresponds to a small aperture. The large aperture provides more exposure as compared to the small aperture.

Optionally, the processor is configured to adjust the shutter speed by increasing or decreasing the shutter speed. A fast shutter speed (for example, such as $\frac{1}{250}$ seconds) provides lower exposure as compared to a slow shutter speed (for example, such as $\frac{1}{2}$ seconds).

Optionally, the processor is configured to adjust the sensitivity of the at least one camera by adjusting a maximum sensitivity threshold and/or a minimum sensitivity threshold at which the given image is to be captured.

As an example, when the object of interest is a real object such as a notebook having an object attribute of a dark blue color, in order to increase the exposure, the maximum sensitivity threshold of the at least one camera may be increased from a lower value to a higher value, without changing the aperture and the shutter speed, for capturing the given image.

Optionally, the processor is configured to:
  detect changes occurring in the gaze direction of the user during a given time period; and
  determine a velocity of the object of interest within the current view based on the changes detected during the given time period, wherein the plurality of object attributes comprises the velocity of the object of interest.

In this regard, within the given time period, the user's gaze direction may change from a first set of pixel segment(s) to a second set of pixel segment(s) within the at least one display image. Optionally, said change in gaze direction corresponds to a movement of the object of interest within the current view. As the object of interest moves from a first location to a second location within the current view, the user's gaze direction follows said movement, and said gaze direction changes from the first set of pixel segment(s) to the second set of pixel segment(s). A velocity of the user's gaze direction is calculated as a rate of change occurring in the gaze direction of the user within the given time period. The velocity of the user's gaze direction corresponds to the velocity of the object of interest. The velocity of the object of interest within the current view is the velocity with which the object of interest is moving within the current view.

Optionally, when adjusting the plurality of camera attributes of the at least one camera, the processor is configured to adjust at least one of: an exposure time, a sensitivity, an aperture of the at least one camera according to the velocity of the object of interest for capturing the given image of the given real-world scene. This allows for providing an accurate optical flow for the object of interest within the view to the presented to the user. Notably, adjusting at least one of the aforesaid camera attributes allows for emulating a manner in which the human visual system perceives the movement of the object of interest. Moreover, an extent of such adjustment is to be selected according to the velocity of the object of interest in order to realistically and accurately emulate said movement perception of the human visual system. Such an adjustment is made in order to avoid the at least one object attribute of the object of interest in motion from getting motion blurred beyond recognition. Such undesirable motion blurring would considerably diminish the user's experience of viewing the visual scene.

As an example, the exposure time of the at least one camera may be adjusted in a manner that the movement of the object of interest within the exposure time remains relatively small as compared to a movement of other object(s) within the at least one display image. Such a manner of adjusting (for example, by reducing) the exposure time allows for maintaining decipherability of the object of interest whilst also representing, to a required extent, the movement of the object of interest.

Moreover, optionally, when adjusting the plurality of camera attributes of the at least one camera, the processor is configured to adjust at least one of: the exposure time, the sensitivity, the aperture of the at least one camera according to a brightness of the object of interest for capturing the given image of the given real-world scene. Optionally, in this regard, adjusting the at least one of the aforesaid camera attributes enables the processor to adjust a brightness of the given image in a manner that the object of interest appears sufficiently dark or bright, as required, in respect of the given image. Notably, adjusting the at least one of the aforesaid camera attributes allows for emulating a manner in which the human visual system would perceive the brightness of the object of interest within the view to be presented to the user.

Optionally, the plurality of camera attributes of the at least one camera are adjusted in a manner that a brightness of all pixels of the two-dimensional region of interest in the at least one display image lies within a dynamic range of the at least one camera.

As an example, when the object of interest is considerably brighter than remaining object(s) present within the at least one display image, the exposure time, the sensitivity (namely, the ISO sensitivity), and the aperture of the at least one camera is adjusted to capture the given image in a manner that the brightness of the object of interest is limited to ensure that the object of interest is not over-exposed and not inconspicuous.

Optionally, when adjusting the exposure time of the at least one camera, the processor is configured to employ a High-Dynamic-Range (HDR) bracketing technique. Optionally, in the HDR bracketing technique, the at least one camera is configured to employ a plurality of exposure times for capturing a plurality of images of the given real-world scene, and the at least one camera or the processor is configured to combine the plurality of images of the given real-world scene to form the given image of the given real-world scene. In particular, a given real object present in the given real-world scene is represented differently within the plurality of images, since the plurality of images are captured using the plurality of exposure times. Notably, a first real object may be better represented in a first image among the plurality of images, whereas a second real object may be better represented in a second image among the plurality of images. Therefore, in the resultant given image of the given real-world scene, a representation of the given real object is selected as required, from amongst the different representations of the given real object within the plurality of images.

It will be appreciated that the HDR bracketing technique can only be used when the given image (of the given real-world scene) to be captured is a still image, since capturing the plurality of images and combining said images is prohibitive for framerate requirements of a video.

Optionally, the imaging system further comprises means for generating a depth or voxel map of the given real-world scene, wherein the processor is configured to:
control the at least one camera to capture a current image of the given real-world scene, whilst controlling said means to generate a current depth or voxel map of the given real-world scene;
generate from the current image the at least one display image representative of the current view based on the current depth or voxel map; and
map the current gaze direction of the user to the current depth or voxel map to determine an optical depth of the object of interest within the current view, wherein the plurality of object attributes comprises the optical depth of the object of interest.

Throughout the present disclosure, the term "means for generating the depth or the voxel map" refers to equipment and/or techniques configured to record and represent optical depth (namely, optical distance) of at least one real object within the given real-world scene. Said means provides a frame of reference from which the optical depth of the at least one real object can be extracted.

Optionally, the means for generating the depth map or the voxel map comprises an imaging device configured to capture a depth image (namely, an image depicting depth) of the given real-world scene to generate the depth map or the voxel map of the given real-world scene. Optionally, in this regard, the depth image is a two-dimensional image or a three-dimensional image. Optionally, the captured depth image require further processing to accurately represent the optical depth of the at least one real object within the given real-world scene. Furthermore, it will be appreciated that the imaging device could be a two-dimensional camera or a depth camera (namely, a ranging camera). Examples of the imaging device include, but are not limited to, a digital camera, an RGB-D camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared camera, and an ultrasound imaging equipment.

Additionally, optionally, the means for generating the depth map or the voxel map comprises a processing module coupled to the imaging device, wherein the processing module is configured to process the captured depth image for generating the depth map or the voxel map of the given real-world scene. In an example, the imaging device may be a stereo camera configured to capture a three-dimensional depth image of the given real-world scene. The processing module coupled to the stereo camera may process said depth image to create a disparity map that may be employed to generate the depth map or the voxel map of the given real-world scene. In another example, the means for generating the depth map or the voxel map may be implemented on a surveying device, wherein the surveying device may be arranged to move within the real world scene for (i) capturing the depth image of the given real-world scene using the imaging device, and (ii) employing Simultaneous Localization and Mapping (SLAM) algorithm to process the captured depth image for generating the depth map or the voxel map of the given real-world scene.

Throughout the present disclosure, the term "depth map" relates to a data structure comprising information pertaining to the optical depth of the at least one real object within the given real-world scene.

Optionally, the depth map is an image comprising a plurality of pixels, wherein a colour of each pixel indicates optical depth of its corresponding real point within the given real-world scene. As an example, the depth map may be a grayscale image wherein each pixel is associated with a single monochromatic colour having intensity ranging from black colour (namely, maximum intensity) to white colour (namely, minimum intensity), wherein a black coloured-pixel depicts maximum optical depth (namely, largest optical distance) of its corresponding point within the given real-world scene, whilst a white coloured pixel depicts minimum optical depth (namely, smallest optical distance) of its corresponding point within the given real-world scene.

Furthermore, throughout the present disclosure, the term "voxel map" used herein relates to a data structure comprising a plurality of three-dimensional volume elements that constitute the given real-world scene, wherein each three-dimensional volume element represents a three-dimensional region within the given real-world scene. A given three-dimensional volume element is indicative of the optical depth of its corresponding point within the given real-world scene.

It will be appreciated that the at least one camera is controlled to capture the current image of the given real-world scene, whilst controlling said means to generate the current depth or voxel map of the given real-world scene, in order to obtain a current optical depth of the at least one real object within the given real-world scene.

Moreover, when the at least one display image is generated from said current image, the current view correctly represents the current optical depth of the at least one real object within the given real-world scene. Furthermore, optionally, when generating the at least one display image from said current image, the processor is configured to add (namely, insert) at least one virtual object at a given optical depth in the current view. Such an addition is independent of the real-world view, and, independent of the at least one real object within the given real-world scene. A given virtual object may draw the attention of the user and become the object of interest. In such a case, the plurality of object attributes of the given virtual object of interest are known to the processor. This facilitates in adjusting the plurality of camera attributes of the at least one camera more accurately with respect to the given virtual object of interest, when capturing the given image of the given real-world scene.

It will be appreciated that "mapping the current gaze direction of the user to the current depth or voxel map" refers to a process of associating the current gaze direction of the user with the current depth or the voxel map to determine those data structure elements of the current depth or the voxel map that substantially correspond to the object of interest. Thereafter, the processor extracts optical depth information associated with such data structure elements to determine the optical depth of the object of interest. This is especially useful when the object of interest is a real object. When the object of interest is a virtual object, the optical depth of the object of interest is known since said virtual object is added at a known optical depth by the processor.

Optionally, when adjusting the plurality of camera attributes of the at least one camera, the processor is configured to adjust a focus length of the at least one camera according to the optical depth of the object of interest for capturing the given image of the given real-world scene.

In this regard, by adjusting the focus length of the at least one camera according to the optical depth of the object of interest, the processor controls the at least one camera to focus sharply within the real-world scene at the optical depth of the object of interest. This allows for the object of interest to appear as sharp as possible within the view to be presented to the user. It will be appreciated that targeting focus of the at least one camera in the aforesaid manner only requires knowledge of (i) the current gaze direction of the user for determining the object of interest, and (ii) the optical depth of the object of interest.

Optionally, when the focus length of the at least one camera is adjusted according to the optical depth of the object of interest, a region of the given real-world scene that lies within a depth of field of said optical depth appears acceptably sharp within the captured given image of the given real-world scene. Moreover, optionally, the processor is configured to implement a blur effect for regions of the given real-world scene that lie outside the depth of field of said optical depth, when generating from the given image the view to be presented to the user.

Herein, the term "blur effect" (namely, bokeh) relates to an aesthetic unfocus (namely, blurring, softness, or lack of clarity) associated with the regions of the given real-world scene that lie outside the depth of field of the optical depth of the object of interest. Upon implementation of said blur effect, relates to a reduction in sharpness of the at least one object lying outside the region of interest, as compared to sharpness of the region of interest.

Optionally, when the object of interest is the virtual object, the processor is configured to adjust a sharpness of the object of interest in a manner that the object of interest appears as sharp as possible within the view to be presented to the user via the display apparatus.

The present disclosure also relates to the method as described above. Various embodiments and variants disclosed above apply mutatis mutandis to the method.

Optionally, in the method, the step of determining the object of interest comprises:
  analyzing the at least one display image to identify a plurality of pixel segments representative of a plurality of objects present within the at least one display image;
  identifying, based on the current gaze direction of the user, at least one of the plurality of pixel segments at which the user is gazing; and
  determining from the at least one of the plurality of pixel segments a size and/or shape of the object of interest.

Optionally, the method further comprises determining the plurality of object attributes of the object of interest based on pixel values of the at least one of the plurality of pixel segments. Optionally, in the method, the step of adjusting the plurality of camera attributes comprises adjusting a white balance of the at least one camera according to the plurality of object attributes of the object of interest for capturing the given image of the given real-world scene.

Optionally, the method further comprises:
  detecting changes occurring in the gaze direction of the user during a given time period; and
  determining a velocity of the object of interest within the current view based on the changes detected during the given time period, wherein the plurality of object attributes comprises the velocity of the object of interest. Optionally, in the method, the step of adjusting the plurality of camera attributes comprises adjusting at least one of: an exposure time, a sensitivity, an aperture of the at least one camera according to the velocity of the object of interest for capturing the given image of the given real-world scene.

Optionally, the method further comprises:

controlling the at least one camera to capture a current image of the given real-world scene, whilst generating a current depth or voxel map of the given real-world scene;

generating from the current image the at least one display image representative of the current view based on the current depth or voxel map; and mapping the current gaze direction of the user to the current depth or voxel map to determine an optical depth of the object of interest within the current view, wherein the plurality of object attributes comprises the optical depth of the object of interest. Optionally, in the method, the step of adjusting the plurality of camera attributes comprises adjusting a focus length of the at least one camera according to the optical depth of the object of interest for capturing the given image of the given real-world scene.

Optionally, in the method, the current view comprises a mixed reality view, wherein the object of interest is a virtual object. Alternatively, optionally, in the method, the current view comprises a mixed reality view, wherein the object of interest is a real object.

DETAILED DESCRIPTION OF THE DRAWINGS

Referring to FIG. 1, illustrated is a block diagram of an architecture of an imaging system 100 for producing images for a display apparatus 102, in accordance with an embodiment of the present disclosure. The imaging system 100 comprises at least one camera (depicted as a camera 104), and a processor 106 communicably coupled to the camera 104.

The processor 106 is configured to:

obtain, from the display apparatus 102, information indicative of a current gaze direction of a user;

determine, based on the current gaze direction of the user, an object of interest within at least one display image, wherein the at least one display image is representative of a current view presented to the user via the display apparatus 102;

adjust, based on a plurality of object attributes of the object of interest, a plurality of camera attributes of the camera 104 for capturing a given image of a given real-world scene; and generate from the given image a view to be presented to the user via the display apparatus 102.

It may be understood by a person skilled in the art that the FIG. 1 includes a simplified architecture of the imaging system 100 for sake of clarity, which should not unduly limit the scope of the claims herein. The person skilled in the art will recognize many variations, alternatives, and modifications of embodiments of the present disclosure.

Figure 2:
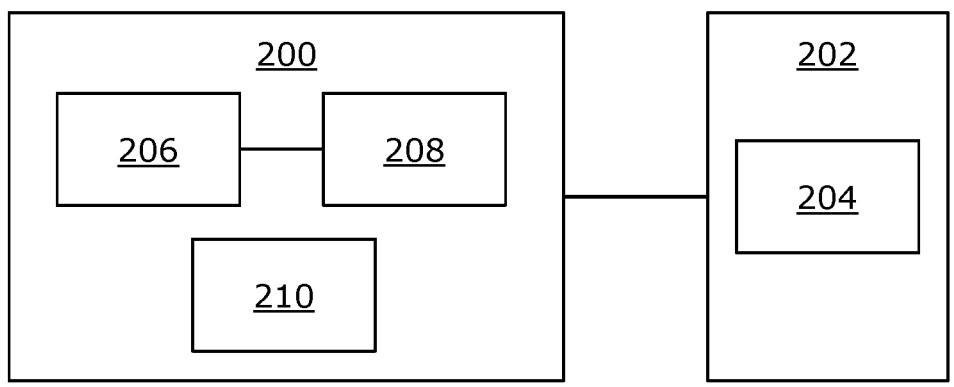

Referring to FIG. 2, illustrated is a block diagram of an architecture of an imaging system 200 for producing images for a display apparatus 202, in accordance with another embodiment of the present disclosure. The display apparatus 202 comprises means 204 for detecting a gaze direction of the user, said means 204 being configured to produce information indicative of the gaze direction of the user. The imaging system 200 comprises at least one camera (depicted as a camera 206), and a processor 208 communicably coupled to the camera 206.

The imaging system 200 further comprises means 210 for generating a depth or voxel map of a given real-world scene, wherein the processor 208 is configured to:

control the camera 206 to capture a current image of the given real-world scene, whilst controlling said means 210 to generate a current depth or voxel map of the given real-world scene;

generate from the current image at least one display image representative of a current view based on the current depth or voxel map; and map a current gaze direction of the user to the current depth or voxel map to determine an optical depth of an object of interest within a current view, wherein a plurality of object attributes comprises an optical depth of the object of interest.

It may be understood by a person skilled in the art that the FIG. 2 includes a simplified architecture of the imaging system 200 for sake of clarity, which should not unduly limit the scope of the claims herein. The person skilled in the art will recognize many variations, alternatives, and modifications of embodiments of the present disclosure.

Figure 3:
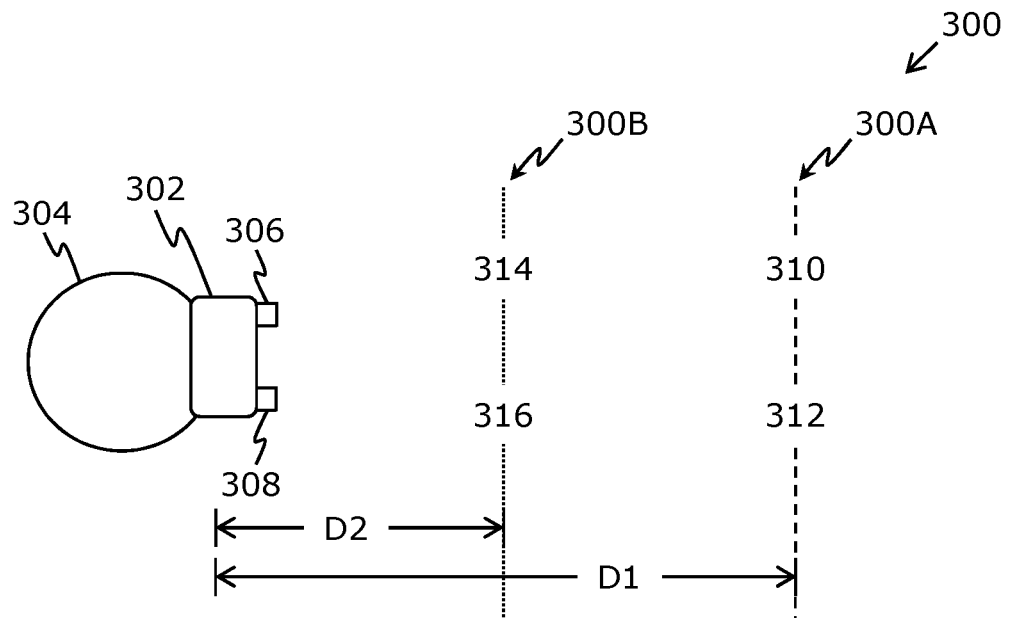
FIG. 3 is an exemplary schematic illustration of how a view generated by an imaging system would appear to a user using a display apparatus, in accordance with an embodiment of the present disclosure.

Referring to FIG. 3, illustrated is an exemplary schematic illustration of how a view 300 generated by an imaging system would appear to a user using a display apparatus 302, in accordance with an embodiment of the present disclosure. The display apparatus 302, in operation, is worn by the user on his/her head 304. The imaging system comprises two cameras (depicted as cameras 306 and 308) and a processor (not shown) communicably coupled to the cameras 306 and 308. The imaging system is shown to be integrated with the display apparatus 302.

Notably, the view 300 is a mixed reality view that is formed upon combination of a real-world view 300A of a given real-world scene and a virtual view 300B. The real-world view 300A represents real objects 310 and 312, whereas the virtual view 300B represents virtual objects 314 and 316. When the user views the view 300, an apparent optical depth of the real objects 310 and 312 is D1, whereas an apparent optical depth of the virtual objects 314 and 316 is D2, D1 being greater than D2. In other words, the virtual view 300B appears to be superposed on the real-world view 300A. When the virtual object 314 is opaque, the real object 310 would not be visible to the user. In such a case, the virtual object 314 would be visible to the user. When the virtual object 316 is substantially transparent, both the real object 312 and the virtual object 316 would be visible to the user.

It may be understood by a person skilled in the art that the FIG. 3 is merely an example for sake of clarity, which should not unduly limit the scope of the claims herein. The person skilled in the art will recognize many variations, alternatives, and modifications of embodiments of the present disclosure. For example, the real-world view 300A and the virtual view 300B may be combined in a manner that the apparent optical depth of the real objects 310 and 312 is same as that of the virtual objects 314 and 316.

Figure 4:
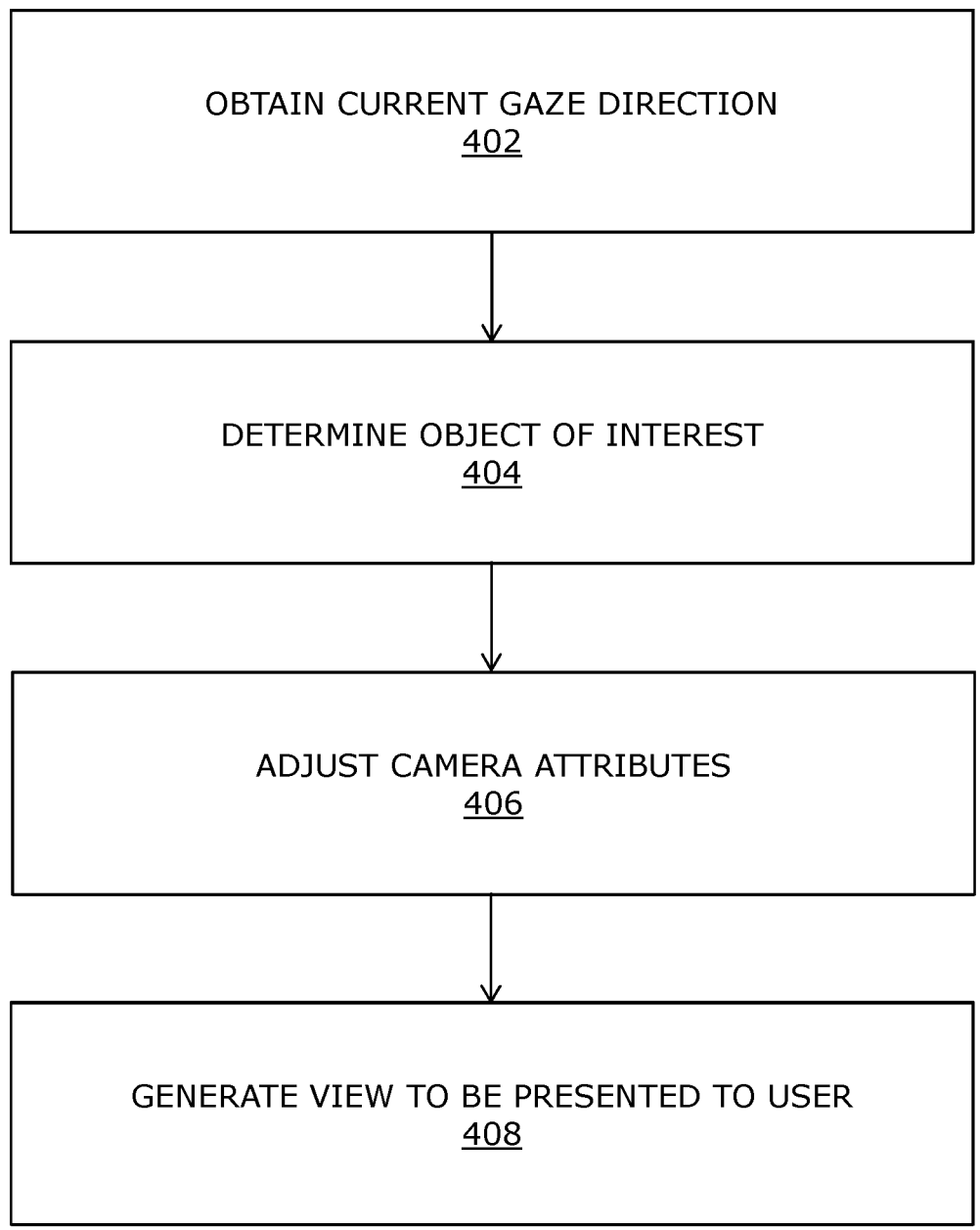
FIG. 4 illustrates steps of a method of producing images for a display apparatus, in accordance with an embodiment of the present disclosure.

FIG. 4 illustrates steps of a method of producing images for a display apparatus, in accordance with an embodiment of the present disclosure. At a step 402, information indicative of a current gaze direction of a user is obtained from the display apparatus. At a step 404, an object of interest within at least one display image is determined, based on the current gaze direction of the user. The at least one display image is representative of a current view presented to the user via the display apparatus. At a step 406, a plurality of camera attributes of at least one camera are adjusted, based on a plurality of object attributes of the object of interest, for capturing a given image of a given real-world scene. At a step 408, a view to be presented to the user via the display apparatus is generated from the given image.

The steps 402 to 408 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system for producing images for a display apparatus, the imaging system comprising:
    at least one camera; and
    a processor communicably coupled to the at least one camera, wherein the processor is configured to:
        obtain, from the display apparatus, information indicative of a current gaze direction of a user;
        determine, based on the current gaze direction of the user, an object of interest within at least one display image, wherein the at least one display image is representative of a current view presented to the user via the display apparatus;
        adjust, based on a plurality of object attributes of the object of interest, a plurality of camera attributes of the at least one camera for capturing a given image of a given real-world scene; and
        generate from the given image a view to be presented to the user via the display apparatus;
    wherein when determining the object of interest, the processor is configured to:
        analyze the at least one display image to identify a plurality of pixel segments representative of a plurality of objects present within the at least one display image;
        identify, based on the current gaze direction of the user, at least one of the plurality of pixel segments at which the user is gazing; and
        determine from the at least one of the plurality of pixel segments a size and/or shape of the object of interest.

2. The imaging system of claim 1, wherein the processor is configured to determine the plurality of object attributes of the object of interest based on pixel values of the at least one of the plurality of pixel segments.

3. The imaging system of claim 2, wherein, when adjusting the plurality of camera attributes of the at least one camera, the processor is configured to adjust at least one of: a white balance, an exposure of the at least one camera according to the plurality of object attributes of the object of interest for capturing the given image of the given real-world scene.

4. The imaging system of claim 1, wherein the processor is configured to:
    detect changes occurring in the gaze direction of the user during a given time period; and
    determine a velocity of the object of interest within the current view based on the changes detected during the given time period, wherein the plurality of object attributes comprises the velocity of the object of interest.

5. The imaging system of claim 4, wherein, when adjusting the plurality of camera attributes of the at least one camera, the processor is configured to adjust at least one of: an exposure time, a sensitivity, an aperture of the at least one camera according to the velocity of the object of interest for capturing the given image of the given real-world scene.

6. The imaging system of claim 1, further comprising means for generating a depth or voxel map of the given real-world scene, wherein the processor is configured to:
    control the at least one camera to capture a current image of the given real-world scene, whilst controlling said means to generate a current depth or voxel map of the given real-world scene;
    generate from the current image the at least one display image representative of the current view based on the current depth or voxel map; and
    map the current gaze direction of the user to the current depth or voxel map to determine an optical depth of the object of interest within the current view, wherein the plurality of object attributes comprises the optical depth of the object of interest.

7. The imaging system of claim 6, wherein, when adjusting the plurality of camera attributes of the at least one camera, the processor is configured to adjust a focus length of the at least one camera according to the optical depth of the object of interest for capturing the given image of the given real-world scene.

8. The imaging system of claim 1, wherein the current view comprises a mixed reality view, wherein the object of interest is a virtual object.

9. The imaging system of claim 1, wherein the current view comprises a mixed reality view, wherein the object of interest is a real object.

10. A method of producing images for a display apparatus, the method comprising:
    obtaining, from the display apparatus, information indicative of a current gaze direction of a user;
    determining, based on the current gaze direction of the user, an object of interest within at least one display image, wherein the at least one display image is representative of a current view presented to the user via the display apparatus;
    adjusting, based on a plurality of object attributes of the object of interest, a plurality of camera attributes of at least one camera for capturing a given image of a given real-world scene; and
    generating from the given image a view to be presented to the user via the display apparatus;
    wherein the step of determining the object of interest comprises:
        analyzing the at least one display image to identify a plurality of pixel segments representative of a plurality of objects present within the at least one display image;
        identifying, based on the current gaze direction of the user, at least one of the plurality of pixel segments at which the user is gazing; and
        determining from the at least one of the plurality of pixel segments a size and/or shape of the object of interest.

11. The method of claim 10, further comprising determining the plurality of object attributes of the object of interest based on pixel values of the at least one of the plurality of pixel segments.

12. The method of claim 11, wherein the step of adjusting the plurality of camera attributes comprises adjusting at least one of: a white balance, an exposure of the at least one camera according to the plurality of object attributes of the object of interest for capturing the given image of the given real-world scene.

13. The method of claim 10, further comprising:
detecting changes occurring in the gaze direction of the user during a given time period; and
determining a velocity of the object of interest within the current view based on the changes detected during the given time period, wherein the plurality of object attributes comprises the velocity of the object of interest.

14. The method of claim 13, wherein the step of adjusting the plurality of camera attributes comprises adjusting at least one of: an exposure time, a sensitivity, an aperture of the at least one camera according to the velocity of the object of interest for capturing the given image of the given real-world scene.

15. The method of claim 10, further comprising:
controlling the at least one camera to capture a current image of the given real-world scene, whilst generating a current depth or voxel map of the given real-world scene;
generating from the current image the at least one display image representative of the current view based on the current depth or voxel map; and
mapping the current gaze direction of the user to the current depth or voxel map to determine an optical depth of the object of interest within the current view, wherein the plurality of object attributes comprises the optical depth of the object of interest.

16. The method of claim 15, wherein the step of adjusting the plurality of camera attributes comprises adjusting a focus length of the at least one camera according to the optical depth of the object of interest for capturing the given image of the given real-world scene.

17. The method of claim 10, wherein the current view comprises a mixed reality view, wherein the object of interest is a virtual object.

18. The method of claim 10, wherein the current view comprises a mixed reality view, wherein the object of interest is a real object.

* * * * *